June 4, 1968

L. F. GENTILE 3,386,359

APPARATUS FOR MAKING PHOTOGRAPHIC IMAGES

Filed June 23, 1965

INVENTOR.
LAWRENCE F. GENTILE

BY his ATTORNEYS

June 4, 1968  L. F. GENTILE  3,386,359
APPARATUS FOR MAKING PHOTOGRAPHIC IMAGES
Filed June 23, 1965  3 Sheets-Sheet 2

INVENTOR.
LAWRENCE F. GENTILE
BY
his ATTORNEYS

June 4, 1968     L. F. GENTILE     3,386,359
APPARATUS FOR MAKING PHOTOGRAPHIC IMAGES
Filed June 23, 1965     3 Sheets-Sheet 3

INVENTOR.
LAWRENCE F. GENTILE
BY
his ATTORNEYS

United States Patent Office 3,386,359
Patented June 4, 1968

3,386,359
APPARATUS FOR MAKING PHOTOGRAPHIC IMAGES
Lawrence F. Gentile, Stamford, Conn., assignor to Time, Incorporated, New York, N.Y., a corporation of New York
Filed June 23, 1965, Ser. No. 466,231
8 Claims. (Cl. 95—11)

ABSTRACT OF THE DISCLOSURE

A camera for making photographic screened images in which the housing is in separable sections, one section accommodating an optical system, another a transparent support for a halftone screen, a pressure plate, and an actutaing device to impart relative movement to the transparent support and the pressure plate to separate them and to bring them together to sandwich a light-sensitive strip therebetween and still another section containing a magazine for the light-sensitive strip.

---

This invention relates to a novel camera for making photographic screened images using a special effects line contact screen.

In conventional cameras used in making photographic screened images, the photographer must load the camera before each exposure. The loading procedure requires the photographer to open the camera back, place the light-sensitive film on the vacuum surface of the camera back with the emulsion side towards the lens, place a screen (e.g., a contact halftone screen) larger in size than the film over the film in contact with the light-sensitive emulsion and the vacuum back, smooth the surfaces of the film and contact screen by using a soft rubber roller, chamois or cloth, turn on the vacuum to hold the film and the contact screen to the camera back and then close the camera back. This procedure requires constant handling of the contact screen. Because the contact screen is so fragile it is almost impossible to handle it time after time without getting scratches, dirt and finger marks thereon and without imparting kinks or bends therein, thus ruining the contact screen.

The novel camera of the present invention overcomes these disadvantages of conventional cameras, permits many exposures to be made on a single loading and in rapid succession and, more importantly, eliminates handling of the contact screen.

In the novel camera of the present invention, a light-sensitive strip is fed intermittently from a roll to a position for exposure between a transparent support on which a contact screen is mounted and a pressure plate, the pressure plate and the contact screen are moved relative to each other to sandwich the strip therebetween and to press the strip against the contact screen, the film is exposed through the transparent support, and after the exposure the pressure plate and the contact screen are separated to permit the light-sensitive strip to be advanced in preparation for the next exposure. The exposed portion of the light-sensitive strip is either stored in the camera housing or fed through a discharge aperture in the camera housing so that it can be cut off from the roll and processed.

For a complete understanding of the present invention, reference can be made to the detailed description which follows and to the accompanying drawings in which.

Figure 1:
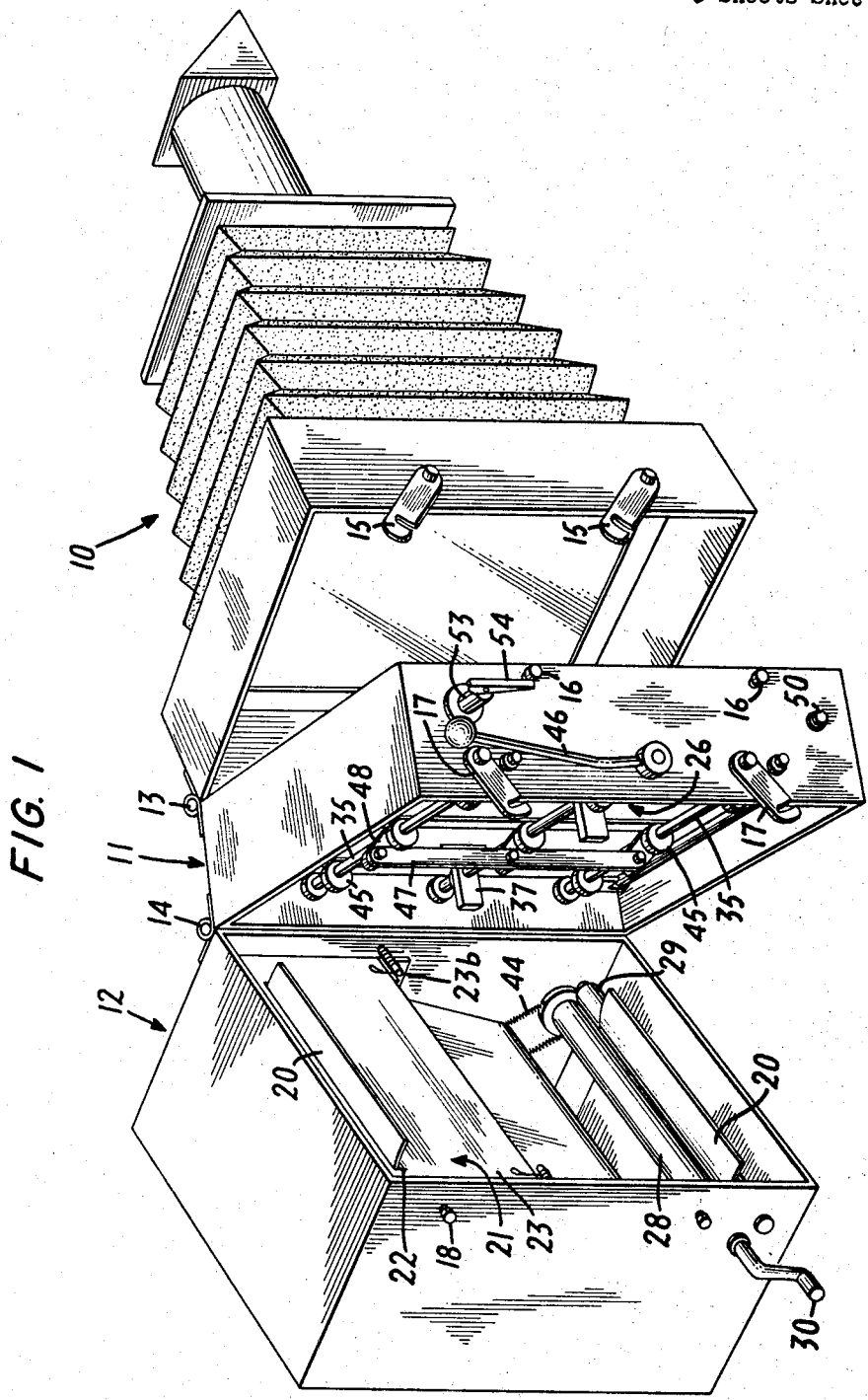
FIGURE 1 is a perspective view of the novel camera of the present invention showing the housing opened.

The camera of the present invention, as best shown in FIGURE 1, includes a front bellows section 10 containing a conventional optical system, an intermediate section 11 and a rear section 12. The front and intermediate sections are connected on one side by hinges 13 permitting the side of the intermediate section opposite the hinges to swing rearwardly from the front section. Also, the intermediate and rear sections are connected on one side by hinges 14 permitting the opposite side of the rear section to swing back from the rear of the intermediate section. The side of the front section opposite the hinges 13 carries a pair of pivotal latches 15 which engage pins 16 on the intermediate section to lock the intermediate section in closed position with respect to the front section. The intermediate section also carries a pair of pivotal latches 17 on the side opposite the hinges 14, and the latches 17 engage pins 18 on the rear section to lock the intermediate and rear sections together.

Figure 3:
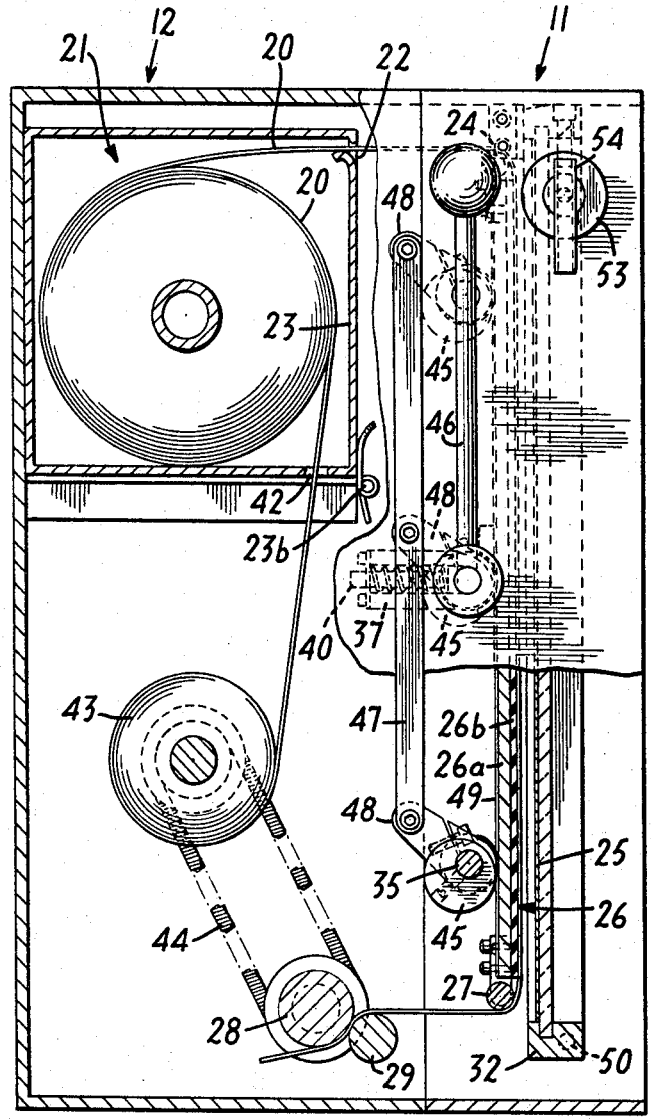
FIGURE 3 is a view, partly in section, taken along the line 3—3 of FIGURE 2, looking in the direction of the arrows.

Referring to FIGURE 3, the light-sensitive film or strip of material 20 to be used in the camera is accommodated within a magazine 21 in the upper region of the rear section 12. The film is fed through a discharge slot 22 in the front wall 23 of the magazine, around a guide roller 24 in the upper region of the intermediate section 11, then downwardly behind a contact screen 25 mounted on a transparent supporting plate 31 and in front of a vertically disposed pressure plate 26, around a lower guide roller 27 and then rearwardly between feed rolls or sprockets 28, 29, in the lower region of the rear section 12. For purposes of this description, the contact screen 25 will be assumed to be a halftone screen which in operative position is located at substantially the focal plane of the optical system. The film is then either stored in roll form in a magazine within the rear section of the camera, or the film is cut, discharged through an aperture in the rear section and processed immediately. The film is advanced stepwise by the rotation of the feed rolls 28, 29. In the embodiment of the camera shown in the drawings, the feed rolls are driven by the rotation of a crank handle 30, but of course the feed rolls can be power driven.

The wall 23 of the magazine is pivoted on hinges 23b so that the magazine can be opened for loading. If the light-sensitive strip has a paper backing which must be stripped off, the backing can be fed through a slot 42 in the bottom of the magazine and onto a wind-up roll 43 accommodated within the back section 12. The wind-up roll 43 is driven by the crank handle 30 through a slip spring drive 44.

Figure 4:
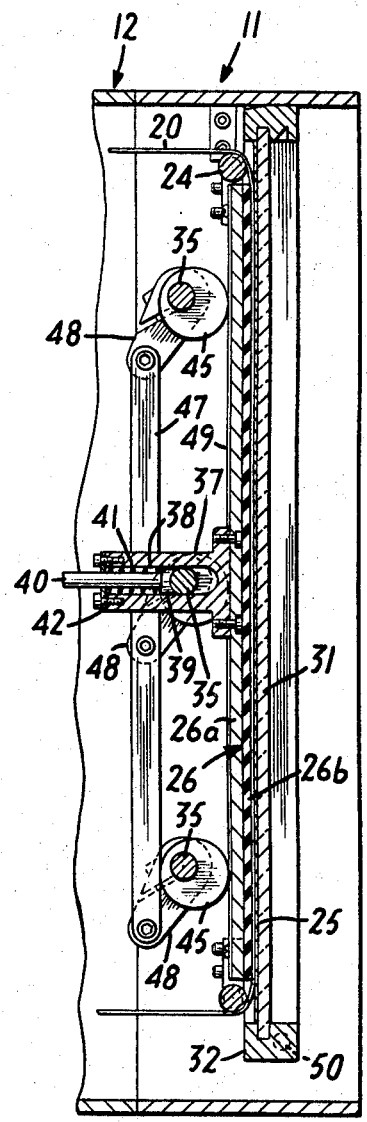
FIGURE 4 is a cross-sectional view of part of the apparatus shown in FIGURE 3, but with the parts shown in a different position.

As best shown in FIGURES 3 and 4, the transparent glass plate 31 is mounted in a frame 32. The lower end of the frame 32 is mounted on pivots 50 within the intermediate section 11 of the camera, and the upper end of the frame is locked in place by the engagement of releasable pins 51 accommodated in the housing of the intermediate section with holes 52 in the sides of the frame 32.

The pressure plate 26 is preferably a lightweight, rigid plate 26a having a resilient facing 26b. The plate, for example, can be made of aluminum and the front facing of rubber. The upper and lower rollers 24 and 27, respectively, are rotatably supported in bearings mounted to the pressure plate.

The pressure plate 26 is mounted for movement toward and away from the halftone screen support on the middle of three horizontally disposed rotatable shafts 35 located in the intermediate section 11 directly behind the pressure plate. Toward this end, a pair of brackets 37 having open slots 38 therein are affixed to the back of the pressure plate, and the intermediate shaft 35 is received in the open slots to support the pressure plate on the shaft. The slot 38 of each bracket accommodates a shaft-engaging shoe 39 having a rearwardly extending stem 40 which projects beyond the end of the slot, and a spring 41 mounted on the stem acts against the shoe 39. The spring and shoe are retained within the slot by a retaining plate 42 held by screws to the rear end of the bracket. The retaining plate has an enlarged hole therein through which the stem 40 extends. The action of the compressed springs 41 tends to urge the pressure plate 26 rearwardly on the intermediate shaft 35.

The movement of the pressure plate 26 from the rearmost position shown in FIGURE 3, in which the pressure plate is spaced apart from the halftone screen 25, to the pressure position shown in FIGURE 4, in which the pressure plate presses the film into contact with the halftone screen, is accomplished by a plurality of eccentric cams 45 on the shafts 35. The cams act against steel strips 49 affixed to the back of the pressure plate. In the position shown in FIGURE 3, the action of the compressed springs 41 urges the back surface of the pressure plate into contact with lower portions of the cams 45 to maintain the pressure plate spaced apart from the halftone screen and out of contact with the film. To move the pressure plate forwardly to the pressure position, the shafts 35 are rotated in unison to the positions shown in FIGURE 4 in which the high portions of the cams are in engagement with the rear surface of the pressure plate, thereby moving the pressure plate forwardly against the film to press the film against the halftone screen 25 on the transparent support 31.

The shafts 35 and the cams 45 thereon are rotated in unison by the actuation of a handle 46 affixed to the end of the intermediate shaft 35 outside the camera housing. An arm 48 is affixed to each of the shafts 35, and the arms are parallel and pivotally connected to a common link 47. The movement of the handle from one position to another imparts rotation to the intermediate shaft 35 which, in turn, imparts rotation to the upper and lower shafts 35 through the link 47 and the arms 48. The position of the pressure plate 26 in both of its positions is thus determined by a plurality of cams 45 (nine in the embodiment illustrated in the drawings) arranged in a uniform array. In the pressure position, the cams cause the rubber-faced pressure plate to press the film with moderate, uniform pressure against the halftone contact screen and its transparent support.

Figure 2:
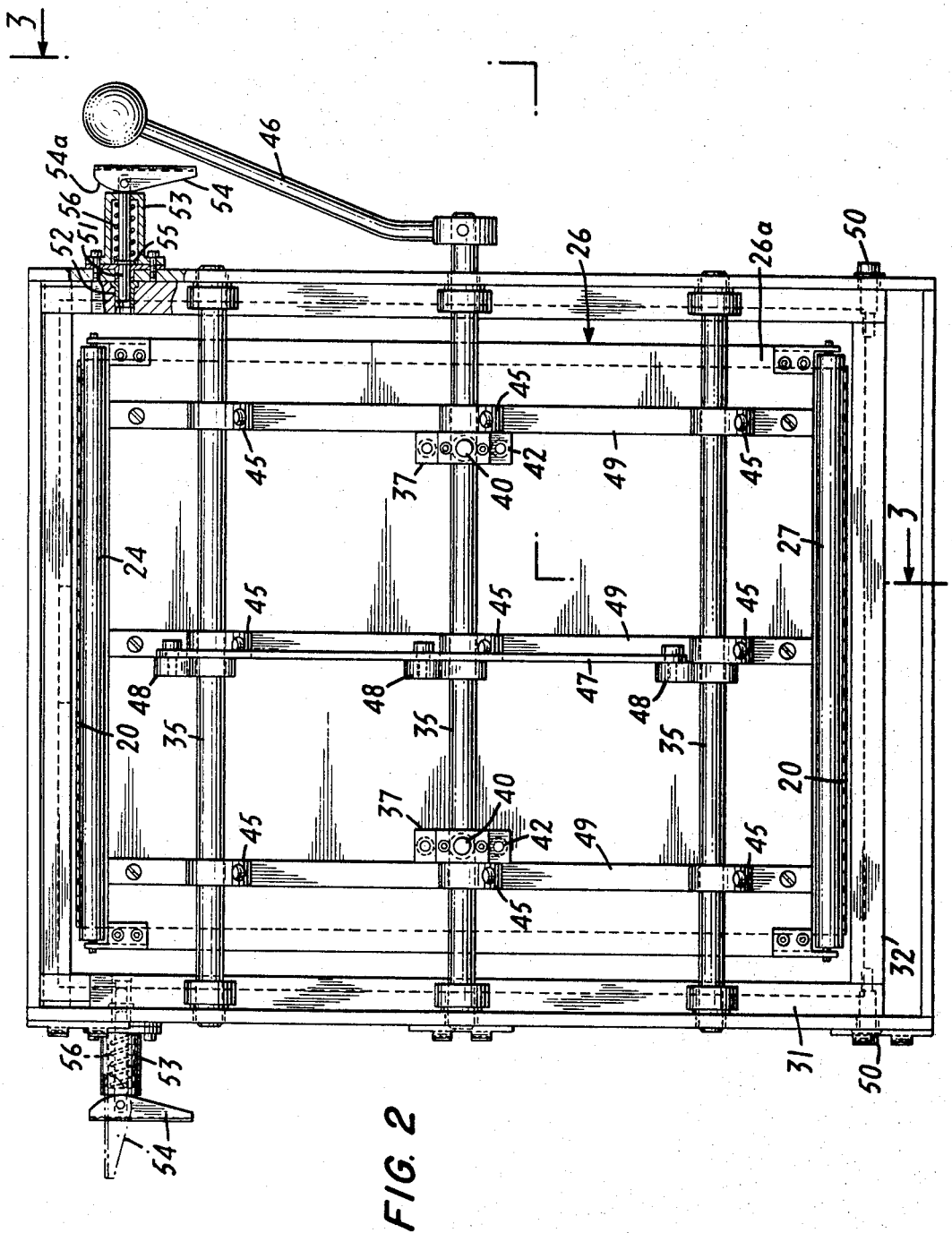
FIGURE 2 is an elevational view of the apparatus which imparts the relative movement to the pressure plate and the transparent support for the contact screen.

To facilitate changing the halftone screen, the intermediate section 11 can be opened and swung away from the back of the front section and the upper end of the frame can be unlocked and the frame swung forwardly on the pivots 50. The frame is unlocked by moving the pins 51 out of engagement with the holes 52. Toward this end, as best shown in FIG. 2, the pins 51 are guided for axial movement within housings 53 mounted to the sides of the intermediate section of the camera. The movement of each pin 51 between its locking and unlocking positions is controlled by a handle 54 pivotally connected to the outer end of the pin. The handle has a cam edge 54a which is urged into engagement with the end of the housing 53 by the action of a compressed spring 56 within the housing 53 and acting against a disc 55 mounted on the pin 51. When the handles 54 are in the positions shown in solid lines in FIGURE 2 of the drawing the pins 51 are permitted to engage the holes 52 in the sides of the frame 32 to lock the frame in place. When the handles 54 are pivoted to the positions shown in broken lines in FIG. 2, the pins are retracted out of engagement with the holes in the frame 32 permitting the frame to be pivoted forwardly to provide access to the halftone screen.

In setting up the camera for operation, the roll of film or other light-sensitive material to be used is loaded in the magazine 21 and threaded through its path of travel in the camera.

When the operator is ready to make the first exposure, the handle 46 is actuated to bring the pressure plate 26 into pressure contact with the film and press the film against the halftone screen. The exposure is made through the transparent support 31. After the exposure is made, the handle 46 is actuated to retract the pressure plate and separate it from the film, and the film is advanced by the operation of the crank handle 30 until the exposed length of film is fed out of the exposure position, and an unexposed portion of film is fed into the position for exposure between the pressure plate and the halftone screen. The exposed portion of the film can be fed into a storage magazine, or it can be fed through a discharge aperture of the rear housing 12, cut on the discharge side of the feed rolls and removed for processing. The exposures can thus be made one after another in rapid succession without handling the halftone screen or without the need to open and close the camera after each exposure.

The invention has been shown and described in a single preferred form and by way of example only, and obviously, many variations and modifications can be made therein within the spirit of the invention. The invention, therefore, is not to be limited to any specific form or embodiment except insofar as such limitations are expressly set forth in the claims.

I claim:

1. A camera for making photographic screened images comprising a housing made up of separable sections to provide access therebetween, an optical system accommodated in a front section, a transparent support for a contact screen in an intermediate section through which an image to be photographed is projected onto a light-sensitive strip, a pressure plate in the intermediate section behind the transparent support cooperating with the transparent support to apply uniform pressure to press the light-sensitive strip uniformly against the transparent support, actuating means to impart relative movement to the transparent support and the pressure plate to separate them to feed the light-sensitive strip therebetween and to close them to sandwich the light-sensitive strip therebetween during exposure, a magazine in a rear section for the light-sensitive strip, means for guiding the light-sensitive strip from the magazine to a position for exposure between the transparent support and the pressure plate when they are spaced apart, and means for locking the sections of the housing together.

2. A camera as set forth in claim 1 including a plurality of rotatable shafts on the side of the pressure plate opposite the transparent support, means cooperating with at least one of the shafts for supporting and guiding the pressure plate for movement toward and away from the transparent support, means urging the pressure plate away from the transparent support, a plurality of eccentric cams carried by said shafts to apply multiple uniform forces against the pressure plate to move it into uniform pressure engagement with the transparent support, and common actuating means for rotating said shafts in unison.

3. A camera as set forth in claim 1 including a take-up roll in said rear section for a backing strip for the light-sensitive strip and a common drive means in said rear section for advancing the light-sensitive strip and for rotating the take-up roll.

4. A camera as set forth in claim 1 including means for hinging the intermediate section to the front section, means for hinging the rear section to the intermediate section, and said locking means constituting means for releasably locking the three sections together.

5. A camera as set forth in claim 4 including means acting on the pressure plate to urge it away from the transparent support and in which the actuating means includes a plurality of eccentric cams to apply simultaneous pressure uniformly on the pressure plate at a plurality of points to move the pressure plate into pressure engagement with the transparent support, supporting shafts for said cams, and means for imparting rotation in unison to said supporting shafts.

6. A camera as set forth in claim 1 in which an actuating means includes a plurality of rotatable shafts within the intermediate housing, eccentric cams mounted on said shafts for moving the pressure plate and transparent support relative to each other, and means for imparting rotation to said shafts in unison.

7. A camera as set forth in claim 6 including means for mounting the pressure plate on at least one of said rotatable shafts for movement relative to the axis of the shaft, and spring means acting on the pressure plate and urging the pressure plate into engagement with said cams.

8. A camera for making photographic half-tones comprising a front camera section housing an optical system therein, a rear camera section separable from the front section, a transparent support for a halftone screen within the rear section, a pressure plate within the rear section behind said transparent support, the pressure plate and transparent support normally being spaced apart to permit a light-sensitive strip to be placed therebetween for exposure in the camera, actuating means to impart relative movement to the transparent support and the pressure plate to sandwich the strip therebetween and press it against the transparent mounting, releasable locking means for engaging and locking one end of the transparent support in operative position, and means pivotally mounting the other end of the transparent support in the rear section so that when the rear section is opened the transparent support can be unlocked and swung on its pivot to provide access to the halftone screen.

References Cited
UNITED STATES PATENTS

| | | | |
|---|---|---|---|
| 1,452,077 | 4/1923 | Huebner | 88—24 |
| 1,569,151 | 1/1926 | Stewart | 95—89 XR |
| 1,612,860 | 1/1927 | Fairchild | 95—12.5 |
| 2,359,582 | 10/1944 | Powers | 95—31 XR |
| 2,564,934 | 8/1951 | Sussin | 88—24 |
| 2,572,357 | 10/1951 | Land | 95—13 |

NORTON ANSHER, *Primary Examiner.*

FRED L. BRAUN, *Assistant Examiner.*